United States Patent [19]
Kawaguchi

[11] Patent Number: 5,671,058
[45] Date of Patent: Sep. 23, 1997

[54] DEVICE FOR SUPPORTING LINEARLY MOVING A MOVABLE MEMBER AND A CONTROLLING SYSTEM FOR THE DEVICE

[75] Inventor: Yoshihisa Kawaguchi, Tokyo, Japan

[73] Assignee: Kabushiki Kaisha Toshiba, Kanagawa-ken, Japan

[21] Appl. No.: 399,025

[22] Filed: Mar. 6, 1995

[30] Foreign Application Priority Data

Mar. 7, 1994 [JP] Japan .................................. 6-035583
Mar. 7, 1994 [JP] Japan .................................. 6-035584
Mar. 7, 1994 [JP] Japan .................................. 6-035585

[51] Int. Cl.$^6$ .................................................. G01B 11/00
[52] U.S. Cl. ........................... 356/401; 356/400; 310/90.5
[58] Field of Search ............................... 356/399, 400, 356/401; 250/234, 559.32; 359/196–200; 310/90.5, 12, 51

[56] References Cited

U.S. PATENT DOCUMENTS 5,287,031  2/1994  Akiba et al. ........................ 310/90.5

FOREIGN PATENT DOCUMENTS 63-316409  12/1988  Japan .
3-277107   12/1991  Japan .
3-277108   12/1991  Japan .
5-122893    5/1993  Japan .

*Primary Examiner*—David C. Nelms
*Assistant Examiner*—Robert Kim
*Attorney, Agent, or Firm*—Finnegan, Henderson, Farabow, Garrett & Dunner, L.L.P.

[57] ABSTRACT

In a device for supporting and linearly moving a movable member has a function that a radial displacement of the movable member is compensated in one position, and a radial angle of the movable member is compensated in other position, or a function that the movable member is supported while maintaining a radial angle of the movable member, or a function that the movable member is positioned on the basis of compensating signals removing the external force generated by a rotational actuator.

16 Claims, 9 Drawing Sheets

5,671,058

DEVICE FOR SUPPORTING LINEARLY MOVING A MOVABLE MEMBER AND A CONTROLLING SYSTEM FOR THE DEVICE

BACKGROUND OF THE INVENTION

1. Field of the Invention

The present invention relates generally to a Fourier transform spectrometer for detecting a component of a gas form, for example, a radiation/absorption spectrum of a gas, and more particularly a device for supporting and linearly moving a movable member having a scanning mirror, which is moved along an optial axis.

2. Description of the Related Art

A Fourier-transform spectrometor has been known as an apparatus, mounted on a spacecraft such as an artificial satellite, for observing a spectrum of infrared radiation, etc. generated from the surface of the atmosphere. Incident radiation received from the earth is divided by a beam splitter which is mounted on the Fourier-transform spectrometor into two paths. One mirror, called a scanning mirror, is moved so that the two paths produce an interference pattern when they are recombined. A signal measured by the detector, an interferogram, can be Fourier transformed to obtain the incident spectrum.

The Fourier-transform spectrometor has a device for supporting and linearly moving a movable member having the scanning mirror. The device for supporting and linearly moving the movable member is required to have a function for positioning the movable member, and there are many types of the function. But some types of the function have the following problems.

For example, in a device which has a function for positioning the movable member on the basis of a radial displacement in each control system formed at different plural positions, the control systems interfere each other, so that the radial angle displacement of the movable member is limited. Accordingly, it is difficult to position the movable member precisely in this device.

In a device which has a function for positioning the movable member by maintaining a center of gravity situated on an axis for linearly moving the movable member, a distance from the movable member to a detector for detecting radial displacement of the movable member is different at each position on the axis, so that a specificity of output from the detector is deteriorated. Accordingly, it is difficult to position the movable member precisely in this device.

In a device which has a function for positioning the movable member, adding a control sysytem for controling an amount of the rotation of the movable member, so that a control force which the control system generates, called an external force, has a bad influence on the function of positioning the movable member. Accordingly, it is difficult to position the movable member precisely in this device.

SUMMARY OF THE INVENTION

An object of the present invention is to provide a device for supporting and linearly moving a movable member which has a function for positioning the movable member.

In accordance with the present invention, there is provided a device for supporting and linearly moving a movable member,
said device comprises;

first supporting means for supporting said movable member in a non-contact manner at a first position;

second supporting means for supporting said movable member in a non-contact manner at a second position;

axial moving means for linearly moving said movable member in a non-contact manner;

first radial position detecting means for detecting a radial position of said movable member at said first position;

second radial position detecting means for detecting a radial position of said movable member at said second position;

a radial position processor for processing an output from said first radial position detecting means to determine a radial position of said movable member;

a radial angle processor for processing outputs from said first and second radial position detecting means to determine a radial angle of said movable member;

a radial position controller for generating a first signal to control said radial position of said movable member in accordance with an output from said radial displacement processor and for controlling said first supporting means in accordance with said first signal; and, a radial angle controller for generating a second signal to control said radial angle of said movable member in accordance with an output from said radial angle processor and for controlling said second supporting means in accordance with said second signal.

Also in accordance with the present invention there is provided a device for supporting and linearly moving a movable member,
said device comprises;

first supporting means for supporting said movable member in a non-contact manner at a first position;

second supporting means for supporting said movable member in a non-contact manner at a second position;

axial moving means for linearly moving said movable member in a non-contact manner;

first radial position detecting means for detecting a radial position of said movable member at said first position;

second radial position detecting means for detecting a radial position of said movable member at said second position;

axial position detecting means for detecting an axial position of said movable member;

a processor for processing outputs from said first and second radial position detecting means and said axial position detecting means to provide a first signal representative of a constant radial angle of said movable member and a target position of a center of gravity in said movable member; and, a controller for generating a second signal to control said radial angle of said movable member and movement of said movable member toward said target position of said center of gravity in said movable member in accordance with said first signal from said processor and for controlling said first and second supporting means in accordance with said second signal.

Further in accordance with the present invention there is provided a device for supporting and linearly moving a movable member,
said device comprises;

first supproting means for supporting said movable member in a non-contact manner at a first position;

second supproting means for supporting said movable member in a non-contact manner at a second position;

axial moving means for linearly moving said movable member in a non-contact manner;

rotation moving means for rotating said movable member;

first radial position detecting means for detecting a radial position of said movable member at said first position;

second radial position detecting means for detecting a radial position of said movable member at said second position;

axial position detecting means for detecting an axial position of said movable member;

rotation detecting means for detecting an amount of rotation of said movable member;

a processor for processing outputs from said first and second radial position detecting means and said axial position detecting means;

a position controller for generating a first signal to control a position of said movable member in accordance with an output from said processor;

a rotation controller for generating a second signal to control a rotation of said movable member in accordance with an output from said rotation detecting means; and, a compensatory controller for generating a compensatory signal substantially free of an effect caused by said rotation controller in accordance with outputs from said position controller and said rotation controller and for controlling said position of said movable member in accordance with compensatory signals.

Additionaly in accordance with the present invention there is provided a control system in a device for supporting and linearly moving a movable member in a non-contact manner at first and second position, said control system comprises;

a radial position processor for determining a radial position of said movable member at said first position;

a radial angle processor for determining a radial angle of said movable member at said second position;

a radial position controller for generating a first signal to control said radial position of said movable member in accordance with an output from said radial position processor and for controlling a radial position of said movable member at said first position in accordance with said first signal; and, a radial angle controller for generating a second signal to control said radial angle of said movable member in accordance with an output from said radial angle processor and for controlling said radial angle of said movable member at said second position in accordance with said second signal.

Also in accordance with the present invention there is provided a control system in a device for supporting and linearly moving a movable member in a non-contact manner at first and second position, said control system comprises;

a processor means for maintaining a radial angle of said movable member constant, for determining a target position of a center of gravity in said movable member; and, a controller for generating controller signals to control a radial angle of said movable member and a position of the center of gravity in said movable member in accordance with an output from said processor, and for controlling said radial angle and said position of a center of gravity of said movable member in accordance with said controller signals.

Further in accordance with the present invention, there is provided a control system, having a rotation controller for controlling a rotation of a movable member in a device for supporting and linearly moving said movable member in a non-contact manner at first and second position, said control system comprises;

a processor for determining a radial position of said movable member;

a position controller for generating a first signal to control a position of said movable member in accordance with an output from said processor; and, a compensatory controller for generating a second signal to control said position of said movable member in response to said first signal and a third signal representative of an external force generated by said rotation controller.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENT

Embodiments of the present invention will now be described with reference to the accomanying drawings.

Figure 1:
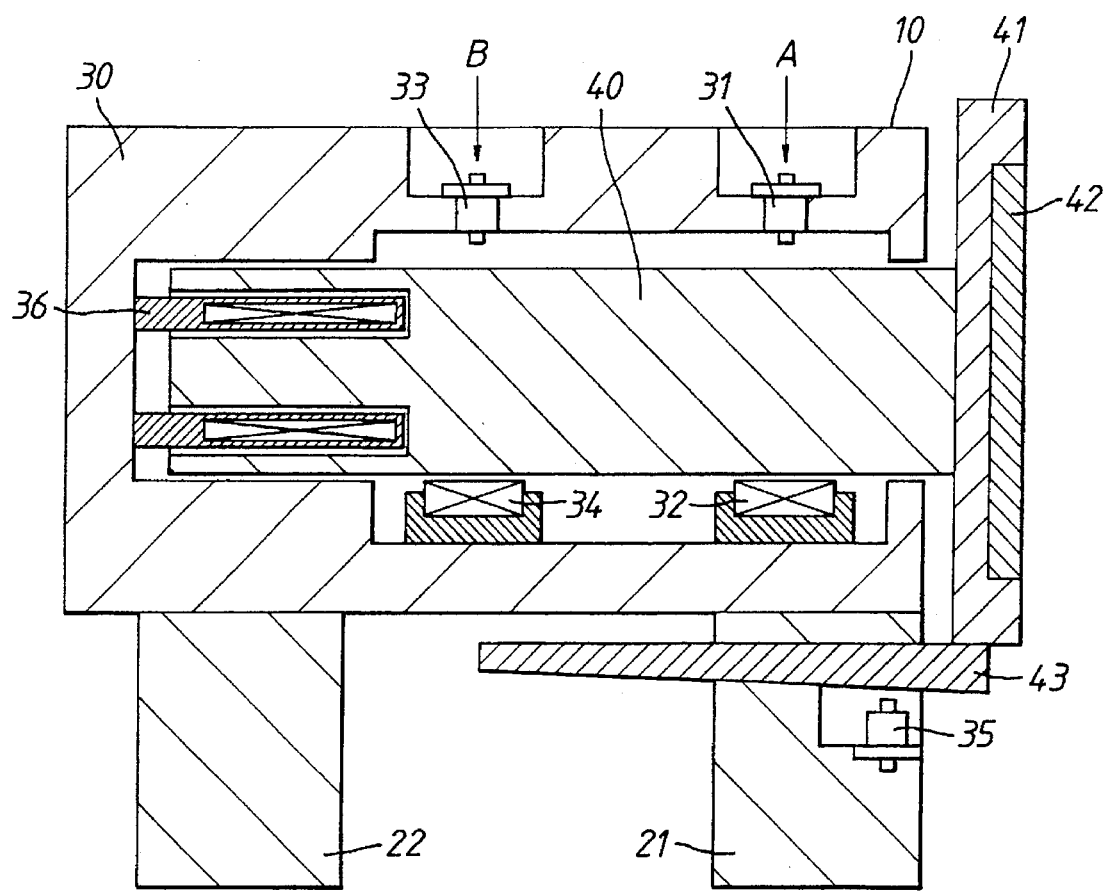
FIG. 1 is a cross-sectional view of a device for supporting and linearly moving a movable member according to a first embodiment.

FIG. 1 is a cross-sectional view of a device for supporting and linearly moving a movable member according to a first embodiment. In FIG. 1, a stationary body 10 comprises a base 21 and a base 22 and a cylindrical member 30 fixed on the base 21 and the base 22. A movable member 40 is situated within the cylindrical member 30 so as to be movable along an axis of the cylindrical member 30 for linearly moving. A mirror support member 41 is mounted on a right end portion of the movable member 40 (FIG. 1). A scanning mirror 42 is fixed on the mirror support member 41. One end portion of an auxiliary plate 43 is fixed on the outer peripheral surface of the mirror support member 41. The lower surfaces (FIG. 1) of auxilary plate 43 is inclined with respect to the axis of the movable member 40 for linearly moving.

At a position indicated by arrow A in FIG. 1, a first group of radial position detectors 31 for detecting a radial position of the movable member 40 and a first group of actuators 32 for supporting the movable member 40 in a non-contact manner are fixed on the cylindrical member 30.

Similarly as the position indicated by arrow A in FIG. 1, at a position indicated by arrow B in FIG. 1, a second group of radial position detectors 33 for detecting a position of the movable member 40 and a second group of actuators 34 for supporting the movable member 40 in a non-contact manner are fixed on the cylindrical member (30).

Figure 2A:
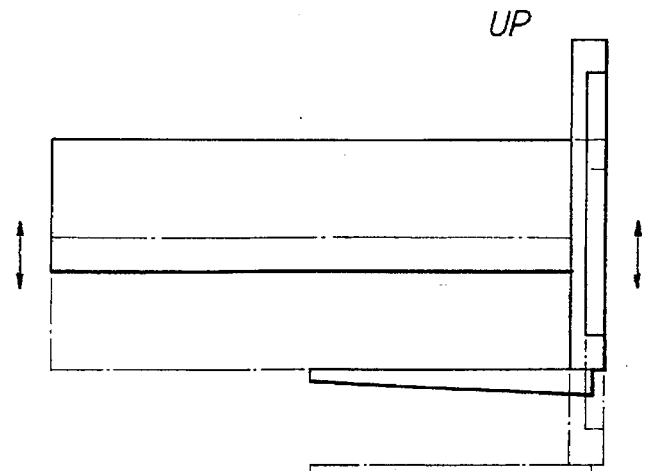
FIGS. 2(a) and 2(b) are cross-sectional view of the movable member which illustrate up and down, right and left movement of the movable member according to the first embodiment.
Figure 2B:
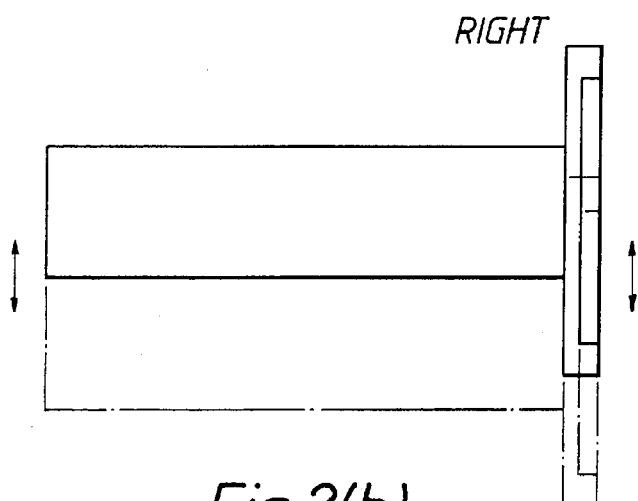

The first group of actuators 32 and the second group of actuators 34 support the movable member with magnetic force. As shown in FIGS. 2(a) and 2(b), the first group of actuators 32 and the second group of actuators 34 adjust up and down movements and right and left movements of the movable member 40.

Further, in FIG. 1, an axial position detector 35 for detecting the axial position of the movable member 40 on the basis of a distance from the axial position detector 35 to the auxiliary plate 43 is fixed on the stationary body 10. An axial position actuator 36 for linearly moving the movable member 40 is fixed on the stationary body 10. The axial position actuator 36 moves the movable member linearly along the axis for linearly moving the movable member 40 with magnetic force.

Figure 3:
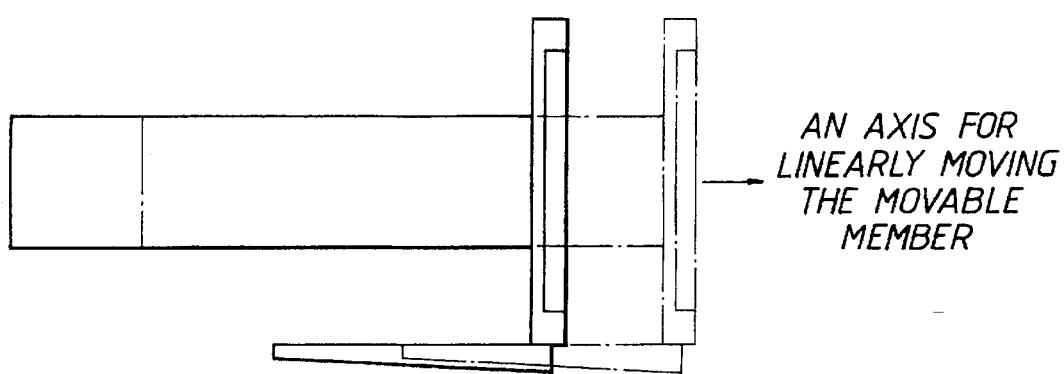
FIG. 3 is a cross-sectional view of the movable member which illustrates the movement of the movable member in a direction of an axis for linearly movement in the first embodiment.
Figure 4:
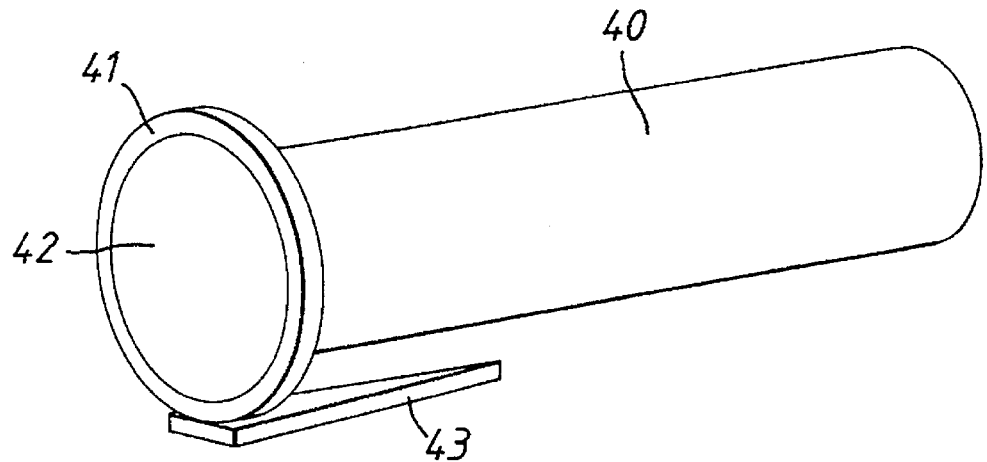
FIG. 4 is a perspective view of the movable member in the device according to the first embodiment.

As shown in FIG. 3, the axial position actuator 36 adjusts a movement of the movable member 40 in the direction of the axis.

Figure 5:
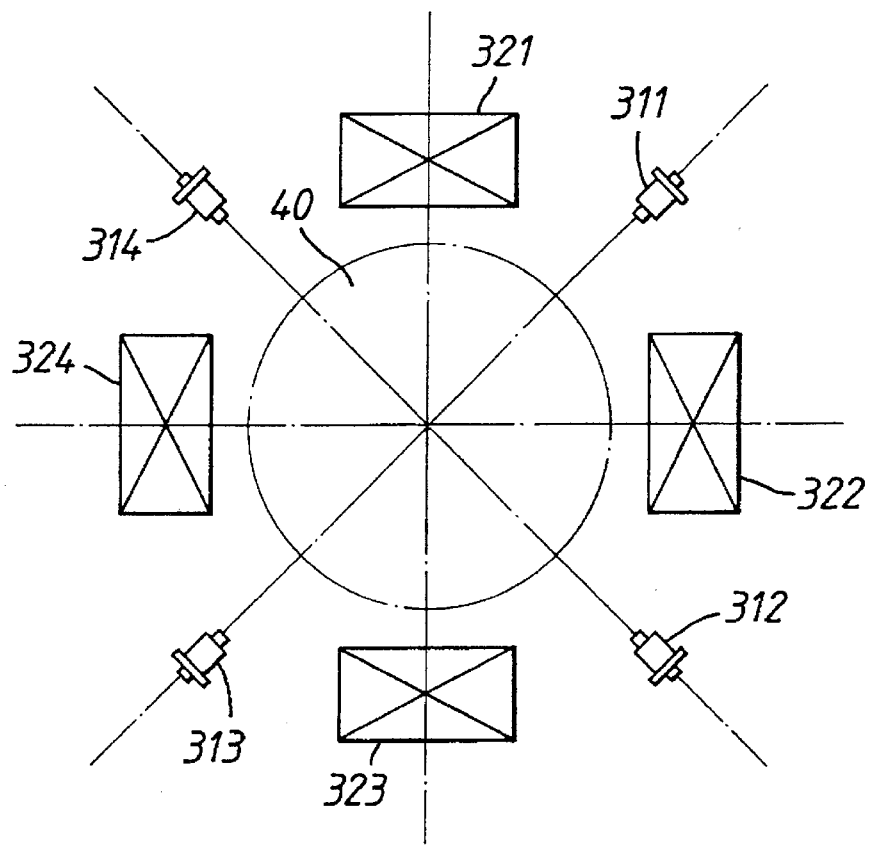
FIG. 5 is a view showing the relative positions of a first group of radial position detectors and a first group of actuators and the movable member according to the first embodiment.

The first group of detectors 31 and the first group of actuators 32 have the relation shown in FIG. 5. Further, the relationship of the second group of detectors 33 and the second group of actuators 34 is similar to the first group of detectors 31 and the first group of actuators 32. The first group of detectors 31 comprises radial position detector 311, 312, 313, 314. The radial position detectors 311, 312, 313, 314 are fixed on the cylindrical member 30 at angular intervals of 90 degrees around the circumferential as shown in FIG. 5. The first group of actuators 32, for example, which actuators comprise magnetic bearings, comprise supporting actuators 321, 322, 323, 324. The supporting actuator 321 is fixed at a position between the radial position detector 314 and the radial position detector 311. The supporting actuator 322 is fixed at a position between the radial position detector 311 and the radial position detector 312. The supporting actuator 323 is fixed at a position between the radial position detector 312 and the radial position detector 313. The supporting actuator 324 is fixed at a position between the radial position detector 313 and the radial position detector 314.

Figure 6:
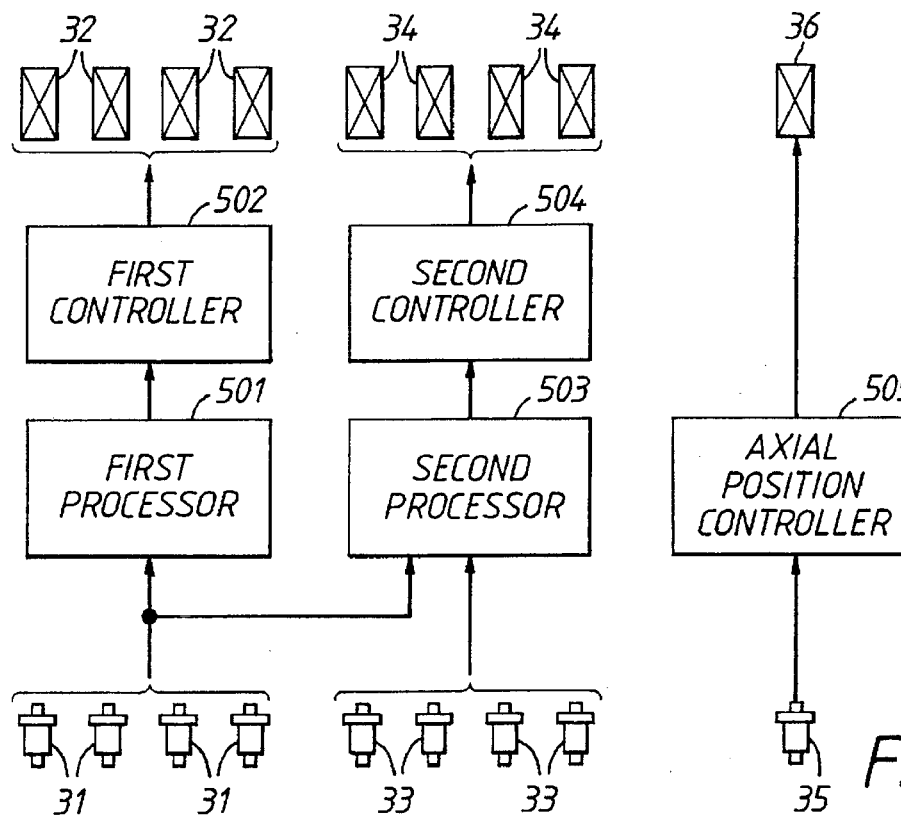
FIG. 6 is a block diagram of a control system in the device according to the first embodiment.

The first group of radial position detectors 31 and the second group of radial position detectors 33 are connected to a control system as shown in FIG. 6. The first group of actuators 32 and the second group of actuators 34 are controlled by outputs from the control system. Outputs from the group of radial position detectors 31 are input to a first processor 501 and a second processor 503. Outputs from the group of radial position detectors 33 are input to the second processor 503. In the first processor 501, a radial displacement of the movable member 40 at the position indicated by arrow A in FIG. 1 is calculated on the basis of outputs from the first group of radial position detectors 31. The radial displacement of the movable member 40 is inputted to a first controller 502. On the basis of the radial displacement of the movable member 40, the first controller 502 generates a compensating signal for compensating the radial displacement of the movable member 40 at the position indicated by arrow A. The first group of actuators 32 is actuated by the compensating signal, and compensates the radial displacement of the movable member 40 at the position indicated by arrow A.

In the second processor 503, a radial displacement of the movable member 40 at the position indicated by arrow A in FIG. 1 is calculated on the basis of outputs from the first group of radial position detectors 31. Furthermore, in the second processor 503, a radial displacement of the movable member 40 at the position indicated by arrow B in FIG. 1 is calculated on the basis of outputs from the second group of radial position detoctors 33. On the basis of radial displacements of the movable member 40 at the positions indicated by arrow A and B, a radial angle of the movable member 40 is calculated, for example, by processscing with a subtracting circuit. The radial angle is inputted to a second controller 504.

On the basis of the radial angle, the second controller 504 generates a compensating signal for compensating the radial angle of the movable member 40. The second group of actuators 34 is actuated by the compensating signal, and compensates the radial angle of the movable member 40 at the position indicated by arrow B. Furthermore, the second group of actuators 32 compensates the radial position of the movable member 40 faster than the first group of actuators 34 compensates radial displacement of the movable member 40.

Outputs from the axial position detector 35 are input to an axial position controller 505. The axial position controller 505 generates a compensating signal, and controls the axial position actuator 36 on the basis of the compensating signal.

As has been described above, in the device for supporting and linearly moving a movable member according to the first embodiment, a radial displacement of the movable member is compensated at one position, and a radial angle of the movable member is compensated at another position. Accordingly, the device according to the first embodiment can prevent a interference of different plural control systems effective, and can perform a function to position the movable member precisely.

Figure 7:
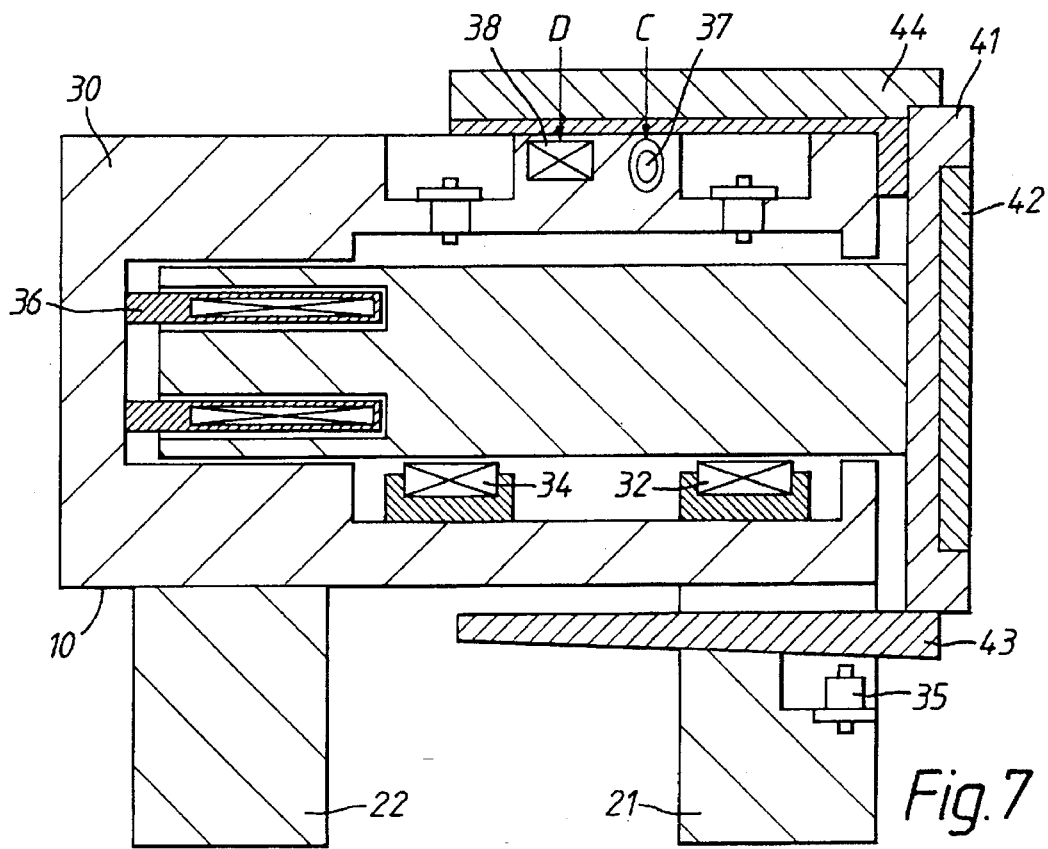
FIG. 7 is a cross-sectional view of the device for supporting and linearly moving a member according to a second embodiment.

FIG. 7 shows a device for supporting and linearly moving a movable member according to a second embodiment. In the device according to a second embodiment, a control system which controls an amount of rotation of the movable member around an axis for linearly moving the movable member is added to the device according to the first embodiment. An explanation of the same structures described with respect to the first embodiment is omitted.

As shown in FIG. 7, a rotational detector 37 for detecting an amount of rotation around an axis for linearly moving the movable member 40 on the basis of a distance from the rotational detector 37 to an auxiliary plate 44 is fixed on the stationary body 10. Further, a rotational actuator 38 for rotating the movable member 40 around the axis of the movable member 40 is fixed on the stationary body 10.

Figure 8:
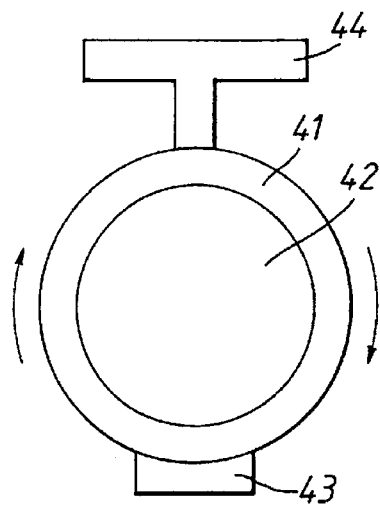
FIG. 8 is a front view of a movable member of a device to illustrate a rotational movement of the movable member according to the second embodiment.

As shown in FIG. 8, the rotational actuator 38 adjusts a rotational movement of the movable member 40 in the direction indicated by arrows (in FIG. 8).

Figure 9:
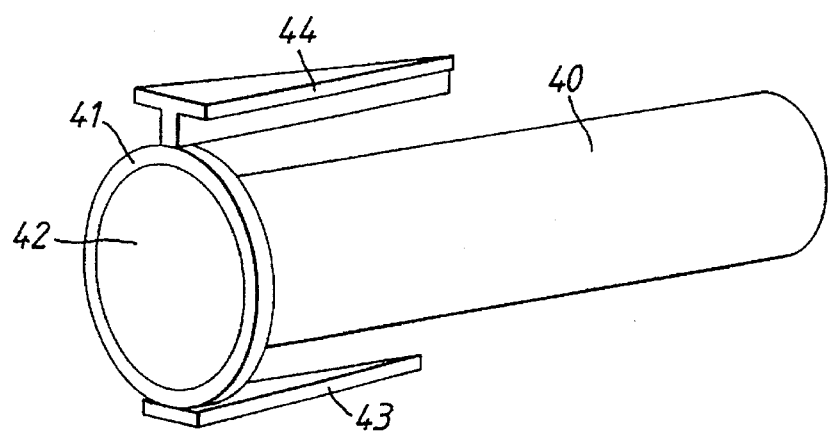
FIG. 9 is a perspective view of a movable member of the device according to a second embodiment.

In the device according to the second embodiment, as shown in FIG. 9, one end portion of the auxiliary plate 44 is fixed on the outer peripheral surface of the mirror support member 41.

Figure 10:
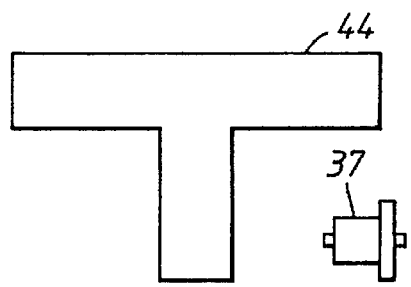
FIG. 10 is a view showing the relative positions of a rotational detector and an auxiliary plate according to the second embodiment.

As shown in FIG. 10, the rotational detector 37 at the position indicated by arrow C in FIG. 7 are set near one side of a lower part of the auxiliary plate 44.

Figure 11:
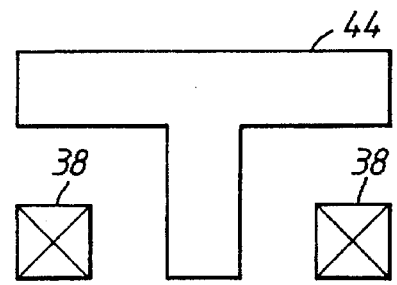
FIG. 11 is a view showing the relative positions of rotational actuators and an auxiliary plate according to the second embodiment.

As shown in FIG. 11, rotational actuators 38 are set at the position indicated by arrow D in FIG. 7 near both sides of a lower part of the auxiliary plate 44.

Figure 12:
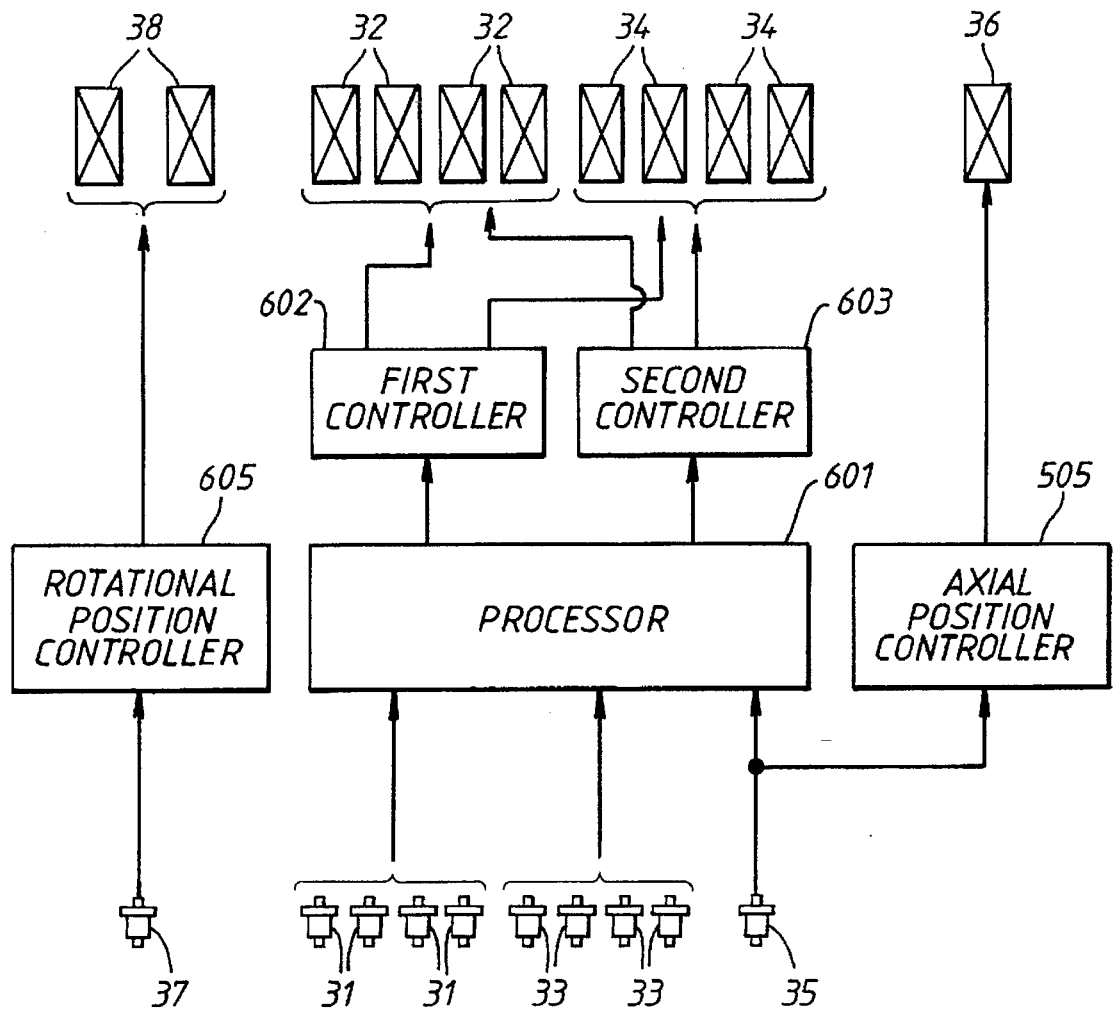
FIG. 12 is a block diagram of a control system in the device according to the second embodiment.

In the device according to the second embodiment, the first group of radial position detectors 31 and the second group of radial position detectors 33 and the axial position detector 35 and the rotational detector 37 are connected to a control system as shown in FIG. 12. Outputs from the first group of radial position detectors 31 and the second group of radial position detectors 33 and the axial position detector 35 are input to a processor 601 further described below. Outputs from the processor 601 are input to a first controller 602 and a second controller 603. On the basis of outputs from the processor 601, the first controller 602, and second controller 603 generate compensating signals.

Outputs from the axial position detector 35 are input to an axial position controller 505 described in the first embodiment. The axial position controller 505 generates a compensating signal, and controls the axial position actuator 36 on the basis of the compensating signal.

Outputs from the rotational detector 37 are input to a rotational position controller 605. The rotational position controller 605 generates a compensating signal, and controls the rotational actuators 38.

Figure 13:
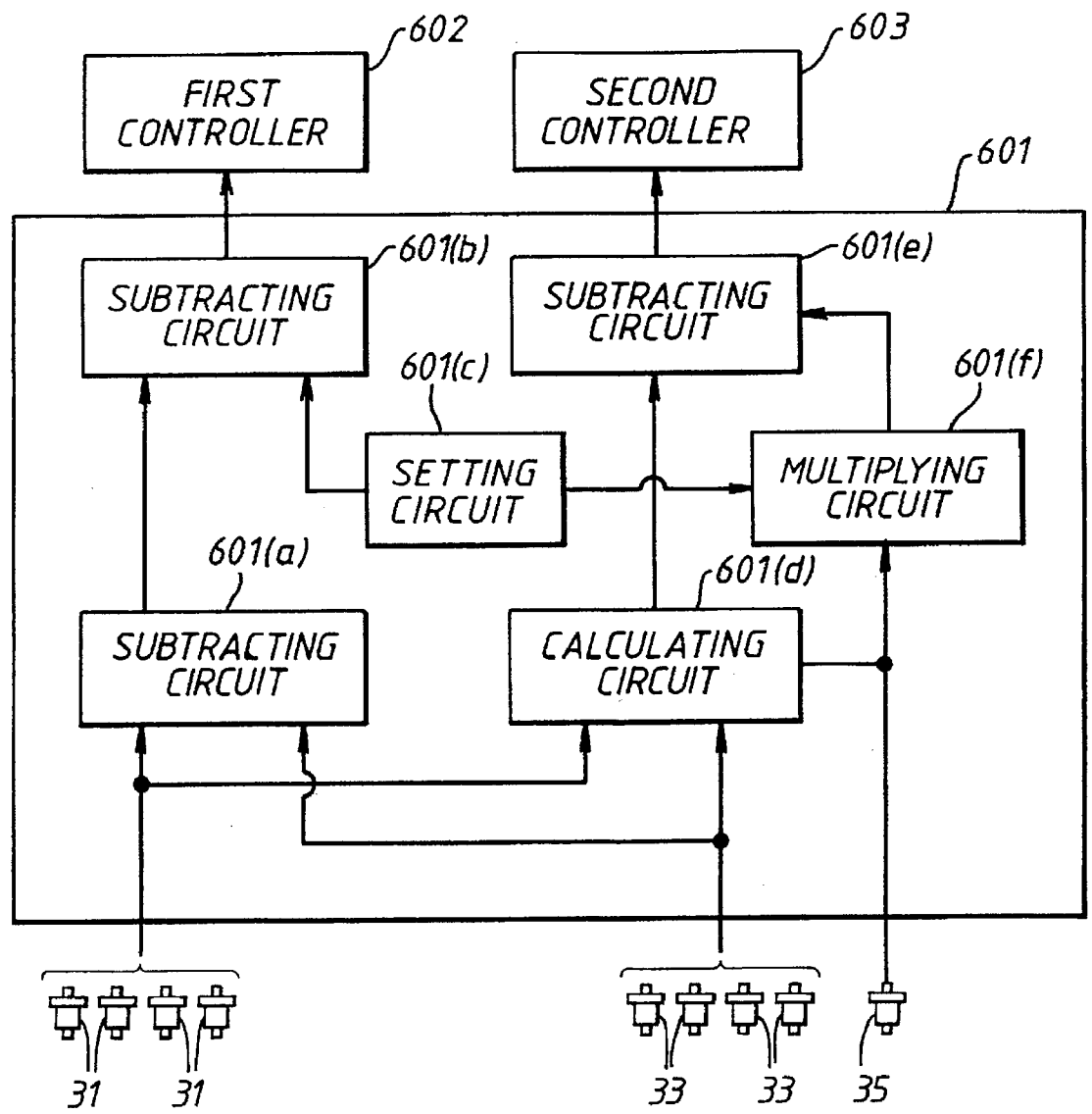
FIG. 13 is a block diagram of a processor in the device according to the second embodiment.

FIG. 13 shows a more detailed representation of the processor 601. In the processor 601 as shown in FIG. 13, outputs from the first group of radial position detectors 31 and the second group of radial position detectors 33 are input to a subtracting circuit 601(a). The subtracting circuit 601(a) calculates a radial angle of the movable member 40 on the basis of these outputs. Outputs from the subtracting circuit 601(a) and a setting circuit 601(c) for setting an angle bias of the movable member 40 are input to a subtracting circuit 601(b). The subtracting circuit 601(b) calculates an amount of error between the radial angle of the movable member 40 calculated by the subtracting circuit 601(a) and an angle bias inputted from the setting circuit 601(c). Outputs from the first group of radial position detectors 31 and the second group of radial position detectors 33 and the axial position detector 35 are input to a calculating circuit 601(d). The calculating circuit 601(d) calculates a center of gravity in the movable member 40. Outputs from the setting circuit 601(c) and the axial position detector 35 are input to a multiplying circuit 601(f).

In the multiplying circuit 601(f), a target position 'E' of the center of gravity in the movable member 40 is calculated on the basis of an angle bias 'F' inputted from the setting circuit 601(c) and a radial displacement 'G' of the movable member 40 inputted from the axial position detector 35. A target position 'E' of the center of gravity in the movable member 40 is given by the following expression.

$$E = F * G.$$

Outputs from the calculating circuit 601(d) and the multiplying circuit 601(f) are input to a subtracting circuit 601(e). The subtracting circuit 601(e) calculates an amount of error between the center of gravity in the movable member 40 inputted from the calculating circuit 601(d) and the target position 'E' of the center of gravity in the movable member 40 inputted from the multiplying circuit 601(f). Outputs from the subtracting circuit 601(b) are input to a first controller 602. On the basis of the outputs, the first controller 602 generates a compensating signal for compensating the radial angle of the movable member 40.

The first group of actuators 32 is actuated by the compensating signal, and compensates the radial angle of the movable member 40.

Furthermore, outputs from the multiplying circuit 601(e) are input to the second controller 603. On the basis of the outputs, the second controller 603 generates a compensating signal for compensating the position of the center of gravity in the movable member 40. The second group of actuators 34 is actuated by the compensating signal, and compensates the position of the center of gravity in the movable member 40.

Figure 14:
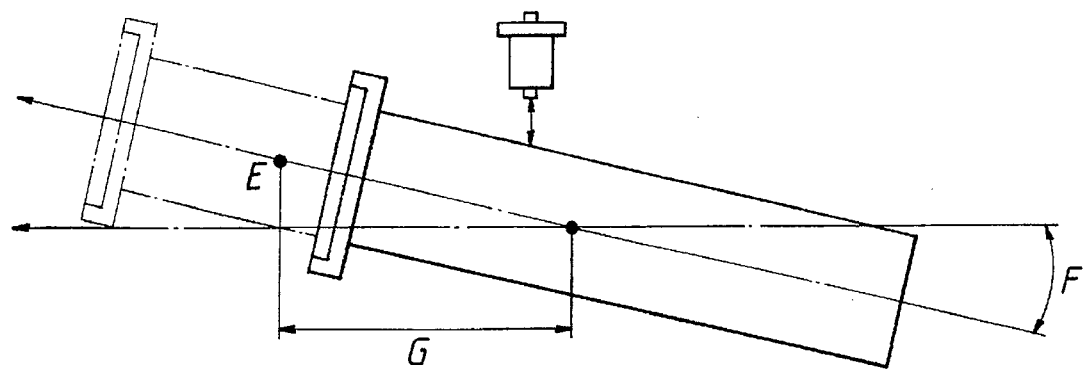
FIG. 14 is a cross-sectional view of a movable member to illustrate the movement of the movable member according to the third embodiment.

As has been described above, in the device for supporting and linearly moving a movable member according to the second embodiment, as shown in FIG. 14, the movable member 40 isn't supported by keeping the center of gravity in the movable member 40 situated on the axis for linearly moving the movable member 40, but is supported by keeping a radial angle 'F' of the movable member 40 almost constant. Accordingly, so that in the device according to the second embodiment, a distance from the movable member 40 to the first group of radial position detectors 31 or the second group of radial position detectors 33 is almost constant, the device according to the second embodiment can always maintain a specificity of outputs from the first group of radial position detectors 31 or the second group of radial position detectors 33 almost constant, and can realize a function to position the movable member precisely.

Figure 15:
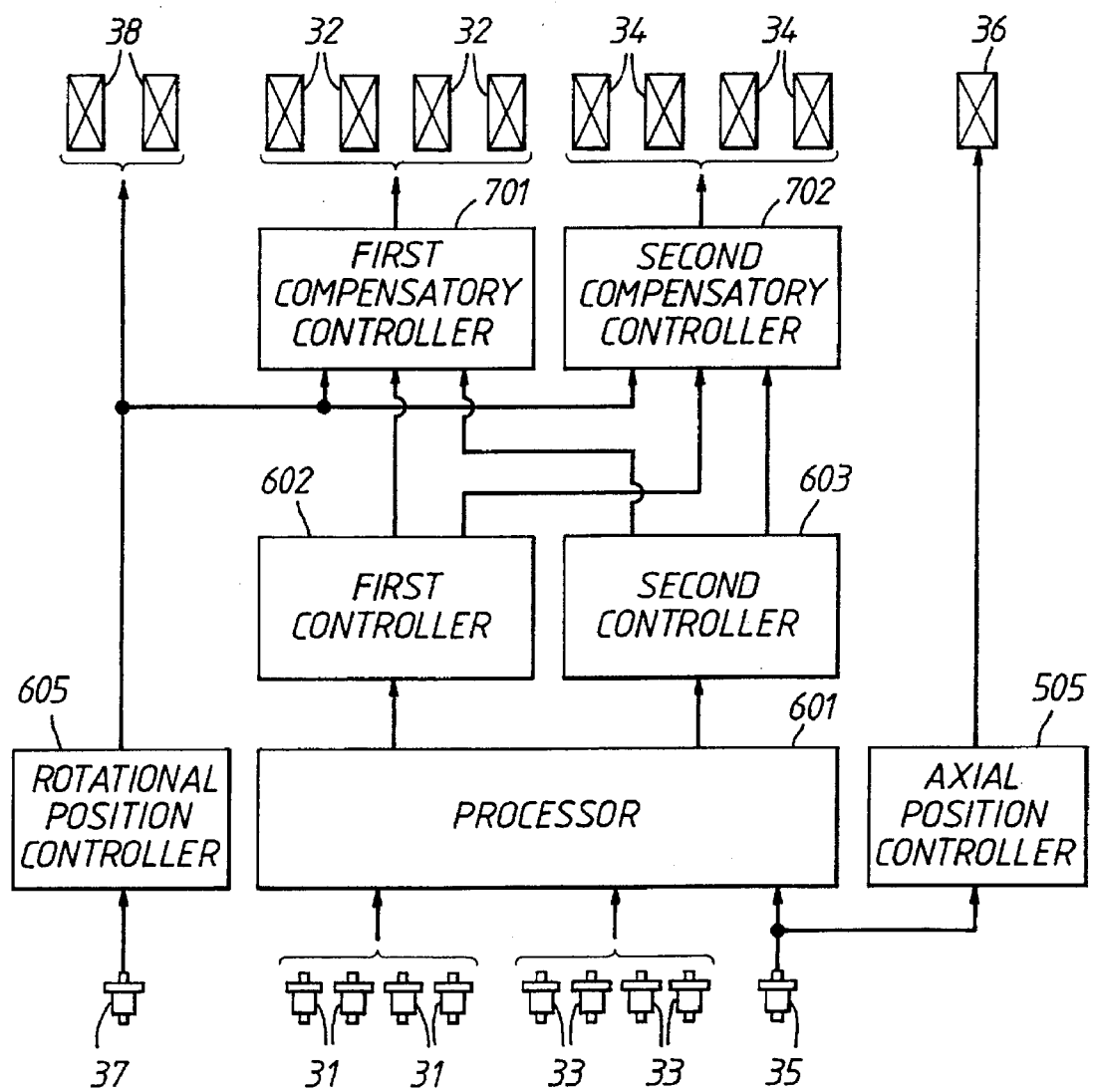
FIG. 15 is a block diagram of a control system in the device according to the third embodiment.

The device according to a third embodiment has a control system as shown in FIG. 15. The device according to the third embodiment is the same as the device according to the second embodiment except for the control system shown in FIG. 15. An explanation of the same structures described with respect to the second embodiment is omitted.

In the device according to the third embodiment, outputs from the first group of radial position detectors 31, the second group of radial position detectors 33, the axial position detector 35 and the rotational detector 37 are input to the control system shown as in FIG. 15. The control system controls the first group of actuators 32 and the second group of actuators 34. Outputs from the first group of radial position detectors 31 and the second group of radial position detectors 33 are input to a processor 601 described for the second embodiment. Outputs from the processor 601 are input to the first controller 602 and the second controller 603 described for the second embodiment.

The first controller 602 generates a compensating signal for compensating the radial angle of the movable member 40. Outputs from the first controller 602 are input to a first compensatory controller 701 and a second compensatory controller 702.

The second controller 603 generates a compensating signal for compensating the position of the center of gravity in the movable member 40. Outputs from the second controller 603 are input to the first compensatory controller 701 and the second compensatory controller 702.

Outputs from the axial position detector 35 are also input to an axial position controller 505. The axial position controller 505 generates a compensating signal and controls the axial position actuator 36 on the basis of the compensating signal.

Outputs from the rotational detector 37 are input to the rotational position controller 605. On the basis of the outputs, the rotational position controller 605 generates a compensating signal for compensating an amount of rotation around the axis for linearly moving the movable member 40, and controls the rotational actuator 38 on the basis of the compensating signal. Outputs from the rotational controller 605 are also input to the first compensatory controller 701 and the second compensatory controller 702.

The first compensatory controller 701 and the second compensatory controller 702 control the first group of actuators 32 and the second group of actuators 34.

Figure 16:
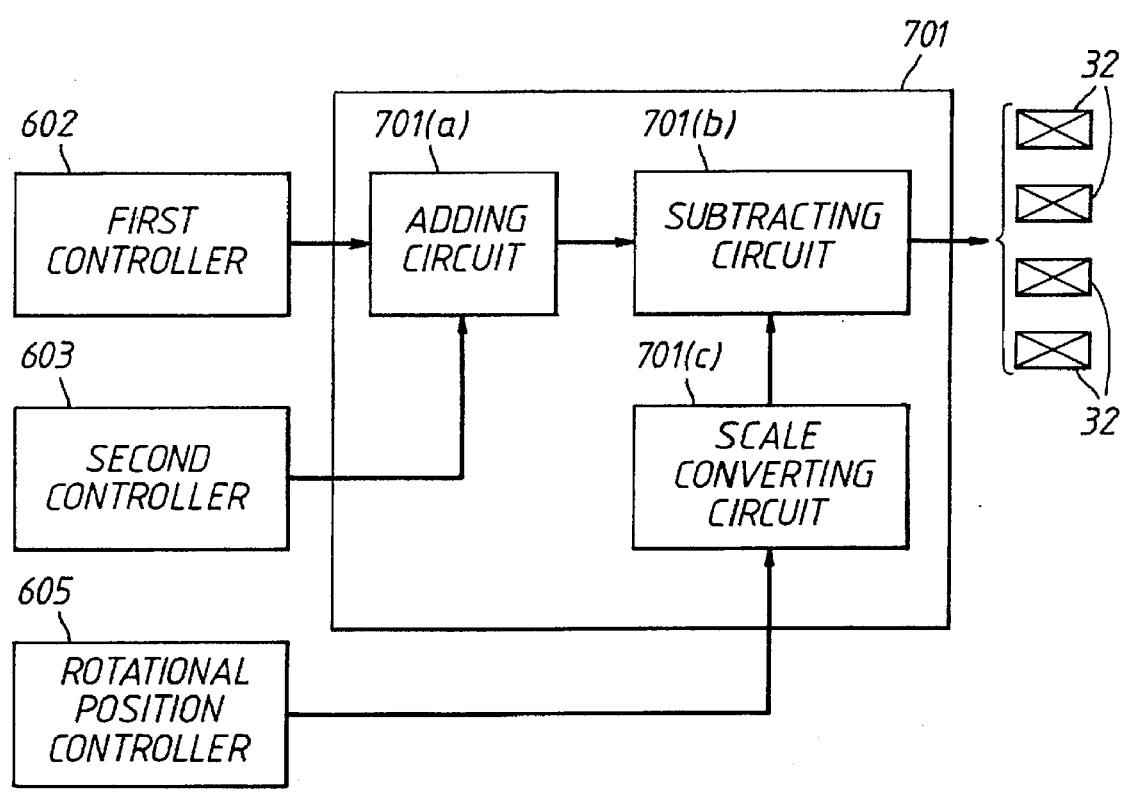
FIG. 16 is a block diagram of a first compensating controller in the device according to the third embodiment.

FIG. 16 shows a more detailed representation of the first compensatory controller 701. As a detail of the second compensatory controller 702 is the same as that shown in FIG. 16, details of the second compensatory controller 702 are omitted.

With reference to FIG. 16, outputs from the first controller 602 and the second controller 603 are input to an adding circuit 701(a). The adding circuit 701(a) adds the outputs from the first controller 602 to the outputs from the second controller 603. Outputs from the adding circuit 701(a) are input to a subtracting cricuit 701(b). Outputs from the rotational position controller 605 are input to a scale converting circuit 701(c). On the basis of the outputs, the scale converting circuit 701(c) calculates an external force generated by the rotational actuator 38, and converts the external force into the same scale of the compensating signal generated by the first control circuit 602 and the second control circuit 603.

Outputs from the scale converting circuit 701(c) are input to the subtracting circuit 701(b). On the basis of outputs from the adding circuit 701(a) and the scale converting circuit 701(c), the subtracting circuit 705(b) generates a compensating signal removing the external force generated by the rotational actuator 38. The first group of actuators 32 is actuated by the compensating signal from which the external force is removed.

As has been described above, in the device for supporting and linearly moving a movable member according to the third embodiment, the first compensating controller 701 and the second compensating controller 702 generate the compensating signals removing the external force generated by the rotational actuator 38, and control the first group of actuators 32 and the second group of actuators 34 on the basis of these compensating signals. Accordingly, the device according to the third embodiment can position the movable member on the basis of the compensating signals removing the external force generated by the rotational actuator 38.

In the above three embodiments, each device has the first group of radial position detectors 31 and the second group of radial position detectors 33, however, the device may have more than two groups of radial position detectors. Further, the device according to the first embodiment may have a control system which controls an amount of rotation around an axis for linearly moving the movable member. Further, the device according to the second embodiment may remove a control system which controls an amount of rotation around an axis for linearly moving the movable member.

What is claimed is:

1. A device for supporting and linearly moving a movable member, said device comprising:

first supporting means for supporting said movable member in a non-contact manner at a first position;

second supporting means for supporting said movable member in a non-contact manner at a second position;

axial moving means for linearly moving said movable member in a non-contact manner;

first radial position detecting means for detecting radial position of said movable member at said first position;

second radial position detecting means for detecting radial position of said movable member at said second position;

a radial position processor for determining radial position of said movable member based on the radial position detected by said first radial position detecting means;

a radial angle processor for determining radial angle of said movable member based on the radial positions detected by said first and second radial position detecting means;

a radial position controller for controlling said first supporting means based on said radial position determined by said radial position processor to adjust said radial position of said movable member; and a radial angle controller for controlling said second supporting means based on said radial angle determined by said radial angle processor to adjust said radial angle of said movable member.

2. The device according to claim 1, wherein said radial position controller controls said first supporting means prior to said radial angle controller controlling said second supporting means.

3. A device for supporting and linearly moving a movable member, said device comprising:

first supporting means for supporting said movable member in a non-contact manner at a first position;

second supporting means for supporting said movable member in a non-contact manner at a second position;

axial moving means for linearly moving said movable member in a non-contact manner;

first radial position detecting means for detecting radial position of said movable member at said first position;

second radial position detecting means for detecting radial position of said movable member at said second position;

axial position detecting means for detecting axial position of said movable member;

a processor for generating at least one signal representative of a constant radial angle of said movable member and a target position of a center of gravity of said movable member based on the radial positions detected by said first and second radial position detecting means and the axial position detected by said axial position detecting means; and a controller for controlling said first and second supporting means based on said signal generated by said processor to adjust a radial angle of said movable member and movement of said movable member toward said target position.

4. The device according to claim 3, wherein said controller comprises a first controller for controlling the first supporting means to adjust said radial angle of said movable member, and a second controller for controlling the second supporting means to adjust said movement of said movable member toward said target position of a center of gravity of said movable member.

5. A device for supporting and linearly moving a movable member, said device comprising:

first supporting means for supporting said movable member in a non-contact manner at a first position;

second supporting means for supporting said movable member in a non-contact manner at a second position;

axial moving means for linearly moving said movable member in a non-contact manner;

rotating means for rotating said movable member;

first radial position detecting means for detecting radial position of said movable member at said first position;

second radial position detecting means for detecting radial position of said movable member at said second position;

axial position detecting means for detecting axial position of said movable member;

rotation detecting means for detecting rotation amount of said movable member;

a processor for generating at least one signal based on said radial positions detected by said first and second radial position detecting means and said axial position detected by said axial position detecting means;

a position controller for controlling said first and second supporting means based on the signal generated by said processor to adjust a position of said movable member;

a rotation controller for controlling said rotating means based on the rotation amount detected by said rotation detecting means; and a compensatory controller for controlling at least one of said first and second supporting means based on outputs of said position controller and said rotation controller while substantially compensating for an effect caused by said rotating means.

6. The device according to claim 5, wherein said signal generated by said processor is representative of a constant radial angle of said movable member and movement of said movable member toward a target position of a center of gravity of said movable member.

7. The device according to claim 6, wherein said position controller comprises a first controller for controlling said first and second supporting means to adjust a radial angle of said movable member, and a second controller for controlling said first and second supporting means to adjust a position of said center of gravity of said movable member.

8. The device according to claim 6, wherein said compensatory controller comprises a first compensatory controller for controlling said second supporting means to adjust a radial angle of said movable member while substantially compensating for said effect caused by said rotating means, and a second compensatory controller for controlling said second supporting means to adjust a position of said center of gravity of said movable member while substantially compensating for said effect caused by said rotating means.

9. A control system for a device for supporting and linearly moving a movable member in a non-contact manner at first and second positions, said control system comprising:

a radial position processor for determining radial position of said movable member at said first position;

a radial angle processor for determining radial angle of said movable member at said second position;

a radial position controller for controlling said radial position of said movable member at said first position based on said radial position determined by said radial position processor; and a radial angle controller for controlling said radial angle of said movable member at said second position based on said radial angle determined by said radial angle processor.

10. The control system according to claim 9, wherein said radial position controller controls said radial position prior to said radial angle controller controlling said radial angle.

11. A control system for a device for supporting and linearly moving a movable member in a non-contact manner at first and second positions, said control system comprising:

processor means for maintaining a radial angle of said movable member constant and for determining a target position of a center of gravity of said movable member; and a controller for controlling said radial angle of said movable member and a position of the center of gravity of said movable member based on an output of said processor means.

12. The control system according to claim 11, wherein said controller includes a first controller for controlling said radial angle based on said output of said processor means, and a second controller for controlling said position of said center of gravity of said movable member based on said output of said processor means.

13. A control system for a device for supporting and linearly moving a movable member in a non-contact manner at first and second position, said control system comprising:

a rotation controller for controlling rotation of said movable member;

a processor for determining radial position of said movable member;

a position controller for controlling a position of said movable member based on an output of said processor; and a compensatory controller for controlling said position of said movable member in response to a first signal generated by said position controller and a second signal representative of an external force generated by said rotation controller.

14. A control system according to claim 13, wherein said processor includes means for maintaining a radial angle of said movable member constant and for determining a target position of a center of gravity of said movable member.

15. The control system according to claim 14, wherein said position controller includes a first controller for controlling said radial angle of said movable member based on said output of said processor, and a second controller for controlling a position of said center of gravity of said movable member based on said output of said processor.

16. The control system according to claim 14, wherein said compensatory controller includes a first compensatory controller for controlling said radial angle of said movable member while substantially compensating for said external force generated by said rotation controller, and a second compensatory controller for controlling said position of said center of gravity of said movable member while substantially compensating for said external force generated by said rotation controller.

* * * * *